United States Patent

[11] 3,630,572

| [72] | Inventor | Robert I. Homier<br>Farmington, Mich. |
|---|---|---|
| [21] | Appl. No. | 860,291 |
| [22] | Filed | Sept. 23, 1969 |
| [45] | Patented | Dec. 28, 1971 |
| [73] | Assignee | Lear Siegler, Inc.<br>Santa Monica, Calif. |

[54] SEAT ASSEMBLY
4 Claims, 6 Drawing Figs.

[52] U.S. Cl. .................................... 297/454,
297/218, 297/219, 297/DIG. 2, 5/354
[51] Int. Cl. ............................................. A47c 7/02,
A47c 27/00, A47c 23/00
[50] Field of Search .......................... 297/452–454,
218–219, 441, DIG. 1; 5/51, 344

[56] References Cited
UNITED STATES PATENTS

| 2,606,330 | 8/1952 | Weston | 5/354 |
| 2,779,036 | 1/1957 | Platt | 5/354 UX |
| 3,184,767 | 5/1965 | Meyers | 5/354 X |
| 3,315,283 | 4/1967 | Larsen | 5/354 |
| 2,801,682 | 8/1957 | Fridolph | 297/218 |
| 3,084,980 | 4/1963 | Lawson | 297/DIG. 2 |
| 3,195,955 | 7/1965 | Richardson et al. | 297/452 |
| 3,233,253 | 2/1966 | Cauvin | 297/128 |
| 3,266,066 | 8/1966 | Bereday | 297/DIG. 1 |
| 3,363,271 | 1/1968 | Schneider | 297/354 |

FOREIGN PATENTS

| 1,494,275 | 7/1942 | France | 297/452 |

*Primary Examiner*—Paul R. Gilliam
*Attorney*—Barnard, McGlynn & Reising

ABSTRACT: A seat assembly comprising a molded foam cushion having laterally spaced bolster portions, a molded plastic pad secured to the bottom of the cushion and having a fine grid and at least two heavy strands. There are openings in the cushion directly above the heavy strands which locate and receive hooks for securing a trim cover to the heavy strands through the cushion. The cushion is secured to a seat frame having seat surface springs.

PATENTED DEC 28 1971

INVENTOR.
Robert I. Homier
BY
Barnard, McGlynn & Reising
ATTORNEYS

PATENTED DEC 28 1971 3,630,572

INVENTOR
Robert I. Homier
BY
Barnard, McGlynn & Reising
ATTORNEYS

SEAT ASSEMBLY

This invention relates to seat assemblies and more particularly to a seat assembly having a pad of formed strands in combination with a cushion having laterally spaced bolsters in which the strands and bolsters have a predetermined spatial relationship to one another for the securement of a trim cover.

In the manufacture of a seat assembly, a cushion of resilient material such as foam is trimmed with a fabric cover and fastened to a seat frame. Ordinarily, a pad of material such as burlap is placed between the cushion and the springs of the frame to prevent gradual deterioration of the foam by interaction with the springs. Heretofore, the assembly of such a seat required the handling and placement of the cushion, pad, trim and trim securement components separately and further often resulted in inexact location of the trim securement means relative to the cushion.

In accordance with the present invention, the assembly of a seat is facilitated and improved by the elimination of separate components and the steps normally required to assemble such components in the desired spatial relationship. In general, this is accomplished by securing a pad having a grid of light strands and a pattern of heavy strands to one surface of a cushion having laterally spaced trim securement locations which are aligned with and spaced from longitudinally extending heavy strands. Accordingly, a trim cover may, in the further assembly of such a seat, be secured through the cushion to the heavy strands and cause the trim to conform to a desired contour of the cushion. The grid further prevents damage and deterioration of the cushion when placed on the springs of a seat or backrest frame.

In a preferred embodiment, the cushion is formed with openings such as slots extending vertically from the inner boundaries of a pair of laterally spaced bolster portions to points directly above the heavy strands of a molded plastic pad secured in a given location to the bottom surface of the cushion. Such openings serve to locate the heavy strands thereby to permit the means for securing the trim to the strands to be precisely located on the cushion during the trimming process.

The various features and advantages of the invention will be best understood by reference to the following description of a specific embodiment thereof. The description is to be taken with the accompanying drawings of which:

Figure 1:
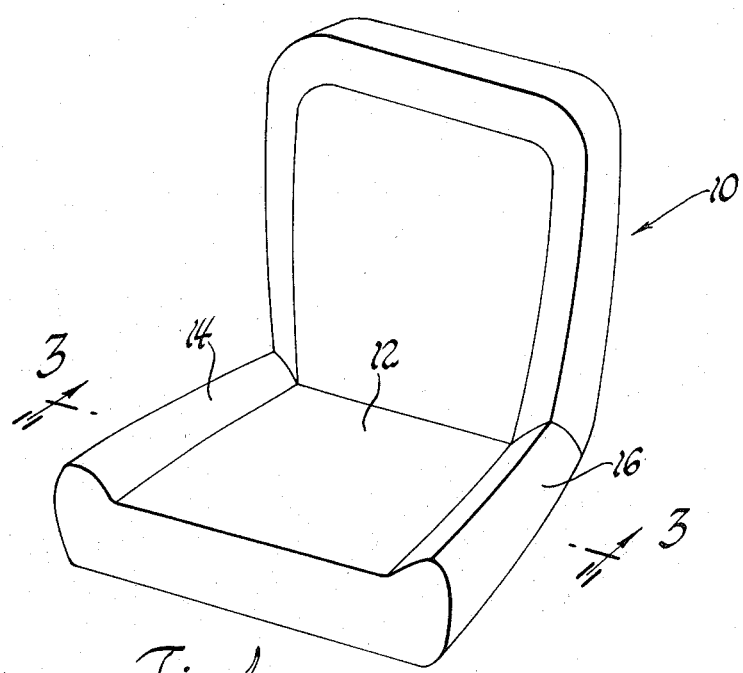
FIG. 1 is a perspective view of a seat assembly trimmed in accordance with an embodiment of the invention.

Referring to FIG. 1, the illustrative embodiment of the invention will be described with reference to a bucket-type seat assembly 10 having a central seat portion 12 bounded by a pair of laterally spaced and longitudinally extending bolsters 14 and 16. The apparatus to be described with reference to the additional figures is directed principally to the horizontal seat surface; however, it is to be understood that the invention is also applicable to the assembly and trimming of the backrest portion of a seat assembly as shown in FIG. 1.

Figure 2:
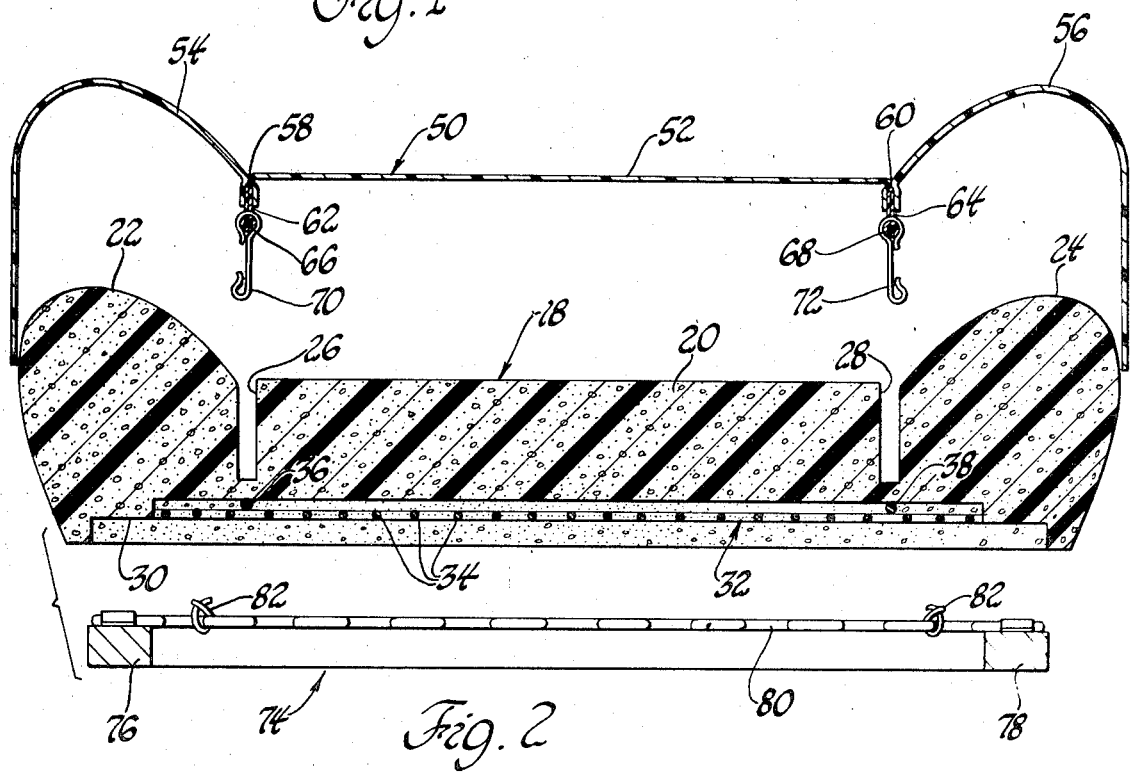
FIG. 2 is a exploded front view in cross section of the seat assembly of FIG. 1.
Figure 3:
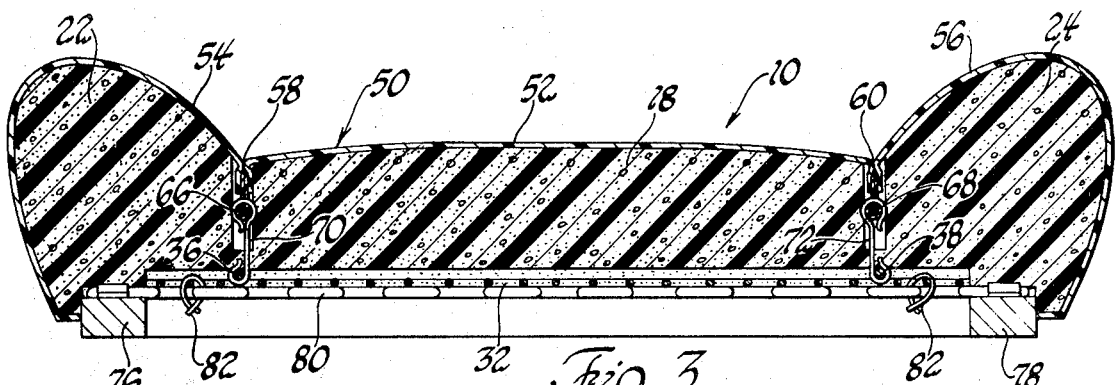
FIG. 3 is a sectional view taken along line 3—3 of FIG. 1.
Figure 4:
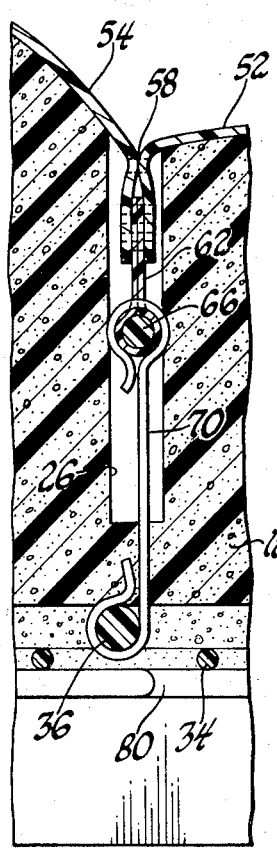
FIG. 4 is an enlarged scale view of the trim securement detail of FIG. 3.

As best shown in FIGS. 2, 3 and 4, seat assembly 10 comprises a molded foam cushion 18 having a flat central seat portion 20 of relatively uniform thickness and a pair of laterally spaced bolsters 22 and 24 of generally increased thickness. Bolsters 22 and 24 are interiorly bounded by vertically extending openings 26 and 28 which are of a depth slightly less than the cushion thickness. Openings 26 and 28 may be slots running longitudinally from front to rear in the cushion 18 or, alternatively, may be series of cylindrical holes performed in the molded cushion. The bottom surface of cushion 18 has formed therein a step and substantially rectangular depression 30. Disposed against the deepest rectangular surface of depression 30 is a molded plastic pad 32, the configuration of which is best shown in FIGS. 5 and 6.

Figure 5:
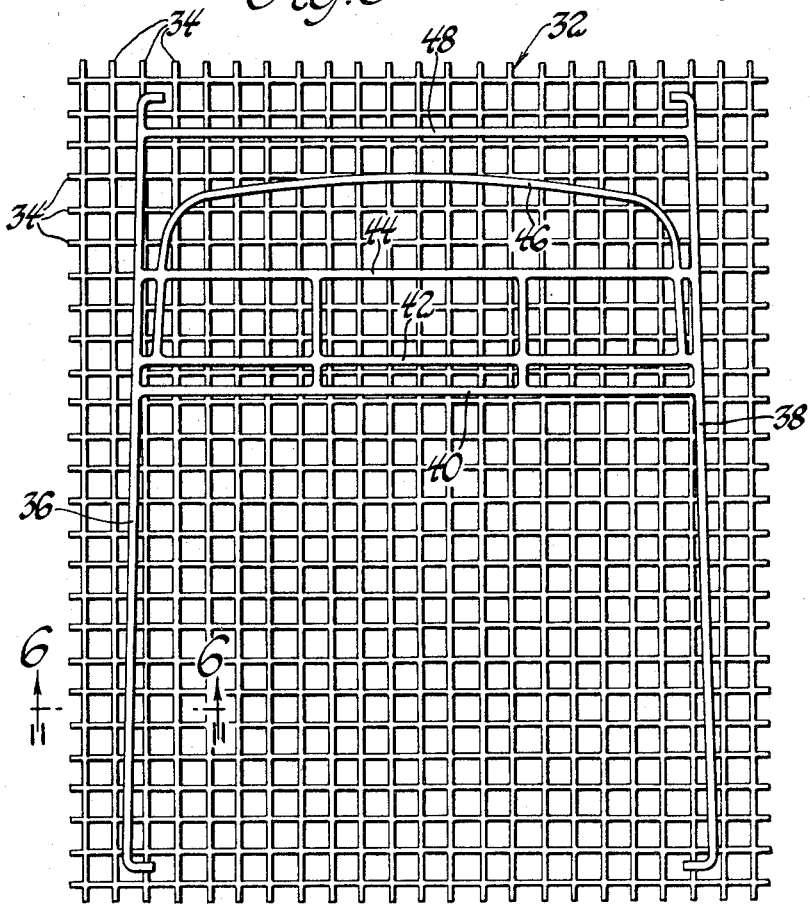
FIG. 5 is a plan view of a molded pad constructed in accordance with the invention.
Figure 6:
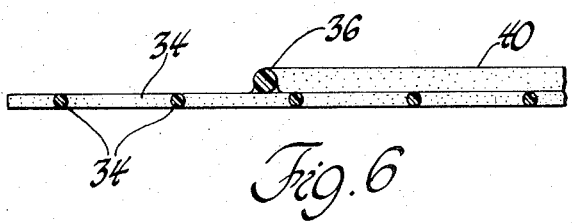
FIG. 6 is a sectional view taken along line 6—6 of FIG. 5.

In FIG. 5, the pad 32 is seen to comprise a grid of relatively light strands 34 which cross each other at right angles and exhibit a regular spacing of approximately three-quarters of an inch. The diameter of strands 34 may be on the order of one-sixteenth inch or less. Integrally formed with the grid is a pattern of relatively heavy longitudinal strands 36 and 38 and interconnected lateral strands 40, 42, 44, 46 and 48 at various spacings to accommodate various seat designs and sizes. The diameter of the heavy strands may be approximately one-eighth inch or less. Pad 32 is preferably formed by injection molding a suitable plastic material such as polypropylene wherein the mold has one surface defining the grid of strands 34 and the opposite surface defining the pattern of heavy strands.

Referring again to FIGS. 2, 3 and 4, the pad 32 is disposed in the depression 30 such that the heavy strands 36 and 38 are directly below and coextensive with the trim securement openings 26 and 28 at the interior edges of bolsters 22 and 24. Pad 32 is preferably bonded in place in the cushion 18. Such bonding may be accomplished by placing the injection-molded pad 32 in the cushion mold and molding the cushion 18 integrally into the pad 32.

Cushion 18, with pad 32 in place, is covered with fabric trim 50 such as vinyl, leather, or cloth. Trim 50 comprises three sections; a central section 52 covering seat portion 20, and side sections 54 and 56 covering the top and sides of bolsters 22 and 24. Sections 52 and 54 are sew together to form a seam 58. Sections 52 and 56 are sewn together to define a seam 60. Sewn into seams 58 and 60 are burlap tape loops 62 and 64 which carry longitudinally extending wires 66 and 68, respectively. Trim 50 is tied down to the heavy strands 36 and 38 through the cushion openings 26 and 28 by formed wire hooks 70 and 72. Each of the hooks 70 and 72 has a looped portion adjacent each end. Hook 70, as best shown in FIG. 4, has one end looped around wire 66 through burlap tape 62 and the other end looped around strand 36. Similarly, hook 62 is connected between wire 68 and strand 38. With the seams 58 and 60 of trim 50 pulled down by the hooks 70 and 72, the trim 50 conforms to and exteriorly defines the bolsters 14 and 16 of seat assembly 10.

The trimmed cushion 18 is placed upon a seat frame 74 comprising a pair of longitudinally extending side rails 76 and 78 which support a plurality of formed wire spring strips 80 to define a horizontal seat support surface. The rails 76 and 78 are laterally spaced apart so as to be received into the first step of depression 30 in the cushion 18. The formed wire springs 80 are, thus, disposed against the grid strands 34 so as to avoid destructive contact with the foam cushion. Hog rings 82 may be used to secure the frame 74 to the pad 32.

It will be observed that a seat assembly comprising bolsters 22 and 24 and a pad 32 may be easily and rapidly trimmed and mounted, the slots 26 and 28 serving to locate the trim 50 relative to the heavy strands 36 and 38 which receive the trim-securing hooks 70 and 72. Hooks 70 and 72 are first secured to the trim 50 via wires 66 and 68 and then placed into the openings 26 and 28 so as to be precisely located over the heavy pad strands 36 and 38. The trim is secured into a taut condition by forcing the hooks through the cushion 18 by manual compression of the cushion. The end loops permit the hooks 70 and 72 to be readily secured to the strands 36 and 38. The side sections 54 and 56 are further secured by ordinary means to complete the trim process.

It will be understood that various modifications are possible to the embodiment set forth in the foregoing specification and, accordingly, it is not to be construed in a limiting sense.

The embodiment of the invention in which an exclusive property or privilege is claimed are defined as follows:

1. In a seat assembly: a foam cushion having top and bottom surfaces, a network of plastic strands bonded to the bottom surface so as to be substantially integral therewith, and trim means covering the top surface and being secured to selected strands in the network by fastener means extending through the cushion, said network includes a mesh of relatively light strands and at least two laterally spaced and longitudinally extending, relatively heavy strands integral with the light strands.

2. Apparatus as defined in claim 1 wherein the cushion comprises a center portion of a first thickness bordered on each side of bolster portions of a second greater thickness, the junctions between the center portion and the bolsters lying vertically over and being substantially coextensive with the heavy strands.

3. Apparatus as defined in claim 2 wherein the cushion has formed in said junctions vertical openings to admit fasteners to fasten the trim to the heavy strands.

4. Apparatus as defined in claim 3 including a plurality of hook-type fasteners extending from the trim means to the heavy strands through said vertical openings.

* * * * *